United States Patent
Kumar et al.

(10) Patent No.: US 9,719,418 B2
(45) Date of Patent: Aug. 1, 2017

(54) TURBOMACHINE INLET BLEED HEATING ASSEMBLY

(71) Applicant: General Electric Company, Schenectady, NY (US)

(72) Inventors: Prashant Kumar, Bangalore (IN); Sabarinath Devarajan, Bangalore (IN); Vivekanandhan Thiruvettipuram Madhivanan, Bangalore (IN); Indrajit Mazumder, Bangalore (IN); Hemant Puri, Bangalore (IN); Chandrasekhar Pushkaran, Bangalore (IN); Rajarshi Saha, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1158 days.

(21) Appl. No.: 13/854,366

(22) Filed: Apr. 1, 2013

(65) Prior Publication Data
US 2014/0294566 A1    Oct. 2, 2014

(51) Int. Cl.
| | |
|---|---|
| *F02C 6/08* | (2006.01) |
| *F02C 7/04* | (2006.01) |
| *F02C 7/047* | (2006.01) |
| *F02C 7/12* | (2006.01) |

(52) U.S. Cl.
CPC .............. *F02C 6/08* (2013.01); *F02C 7/047* (2013.01); *F02C 7/12* (2013.01); *F05D 2260/213* (2013.01); *Y02E 20/16* (2013.01)

(58) Field of Classification Search
CPC ...... F01D 25/12; F04D 29/324; F04D 29/542; F04D 19/02; F02C 7/18; Y02C 50/676
USPC .............................................. 415/1, 115, 117
See application file for complete search history.

(56) References Cited

U.S. PATENT DOCUMENTS

| | | | | |
|---|---|---|---|---|
| 3,751,909 | A * | 8/1973 | Kohler | F01D 5/148 |
| | | | | 415/115 |
| 4,271,664 | A | 6/1981 | Earnest | |
| 5,491,971 | A | 2/1996 | Tomlinson et al. | |
| 6,027,304 | A | 2/2000 | Arar et al. | |
| 6,098,395 | A | 8/2000 | North | |
| 6,226,974 | B1 | 5/2001 | Andrew et al. | |
| 6,543,234 | B2 | 4/2003 | Anand et al. | |
| 7,841,186 | B2 | 11/2010 | So et al. | |
| 8,001,789 | B2 | 8/2011 | Vega et al. | |
| 8,721,265 | B1 * | 5/2014 | Brostmeyer | F04D 19/02 |
| | | | | 415/1 |
| 8,858,161 | B1 * | 10/2014 | Ryznic | F02C 7/143 |
| | | | | 415/1 |
| 9,260,968 | B2 * | 2/2016 | Dutta | F01D 5/005 |
| 2010/0175388 | A1 | 7/2010 | Tillery | |

* cited by examiner

*Primary Examiner* — Nicholas J Weiss
*Assistant Examiner* — Dapinder Singh
(74) *Attorney, Agent, or Firm* — Ernest G. Cusick; Hoffman Warnick LLC

(57) ABSTRACT

In a turbomachine having an inlet, a compressor, and a turbine, a closed loop sends fluid from a stage of the compressor to a heat exchanger in the turbine and to the inlet. The closed loop heats the fluid, cools the turbine, and delivers heated fluid to the inlet. A mixer can be interposed between the heat exchanger and the inlet to mix fluid from the heat exchanger with compressor discharge fluid, delivering the mixed fluid to the inlet. The mixer can control flow received so that desired temperature and/or flow rate can be provided to the inlet.

16 Claims, 6 Drawing Sheets

TURBOMACHINE INLET BLEED HEATING ASSEMBLY

BACKGROUND OF THE INVENTION

The disclosure relates generally to turbomachinery, and more particularly, to inlet bleed heating assemblies for turbomachinery, such as gas turbines, including turbomachinery installed in combined cycle power plants and other arrangements.

A turbomachine, such as a gas turbine and/or a combined cycle power plant, can be operated at a range of loads and/or power settings. However, typically a gas turbine will suffer degradation in efficiency when running at less than full load/power and/or when running lean. To reduce the degradation, inlet bleed heating (IBH) has been employed, in which a supply of compressor discharge air is fed into the inlet of the gas turbine during less-than-full load/power.

BRIEF DESCRIPTION OF THE INVENTION

Embodiments of the invention disclosed herein may take the form of a turbomachine inlet with a first conduit configured for fluid communication with a stage of a compressor of a turbomachine and with a cavity located at a stage of a turbine of the turbomachine and substantially sealed against fluid communication with the stage of the turbine. A second conduit can be configured for fluid communication with the cavity and with an inlet of the turbomachine.

Another embodiment can include a turbomachine having an inlet, a compressor in fluid communication with the inlet and including at least one stage and a compressor discharge, and a turbine in fluid communication with the compressor discharge and including at least one stage. A first conduit can be in fluid communication with a stage of the compressor and a cavity at a stage of the turbine. A second conduit can be in fluid communication with the cavity at the stage of the turbine and with the inlet.

A further embodiment can include a turbomachine having an inlet, a compressor with at least one compressor stage and a compressor discharge, and a turbine with at least one turbine stage. The inlet, compressor, and turbine can be arranged in serial fluid communication so that fluid entering the inlet passes through the compressor into and through the turbine. In addition, the turbomachine can include an inlet bleed heater in fluid communication with a stage of the compressor, a heat exchanger at a stage of the turbine, and the inlet, the heat exchanger being substantially sealed from fluid communication with the stage of the turbine.

Other aspects of the invention provide methods of making embodiments of the invention disclosed herein, as well as variants of the apparatus, which include and/or implement some or all of the actions and/or features described herein. The illustrative aspects of the invention are designed to solve one or more of the problems herein described and/or one or more other problems not discussed.

BRIEF DESCRIPTION OF THE DRAWING

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

The detailed description explains embodiments of the invention, together with advantages and features, by way of example with reference to the drawings.

DETAILED DESCRIPTION OF THE INVENTION

Broadly, embodiments of the invention herein can bleed fluid from a compressor stage, send it through a heat exchanger in a turbine, and use the heated fluid in inlet bleed heating. The heat exchanger can simultaneously heat the fluid and cool the turbine, enhancing operation of the turbine, and the heated fluid enhances operation of the compressor beyond conventional inlet bleed heating. The heat exchanger can be formed within an existing cavity in the turbine, such as by adding one or more walls in a gap between inner and outer casings of the turbine, and can be in fluid communication with cooling passages of turbine blades to enhance fluid heating and turbine cooling. A mixer can receive the heated fluid as well as a bleed from the compressor discharge, varying flow from each to produce a mixed flow of a desired temperature and/or flow rate that can be used or the inlet bleed heating. For example, a control system of the gas turbine can actuate a valve of the mixer to obtain a desired temperature/flow rate for inlet bleed heating.

Figure 1:
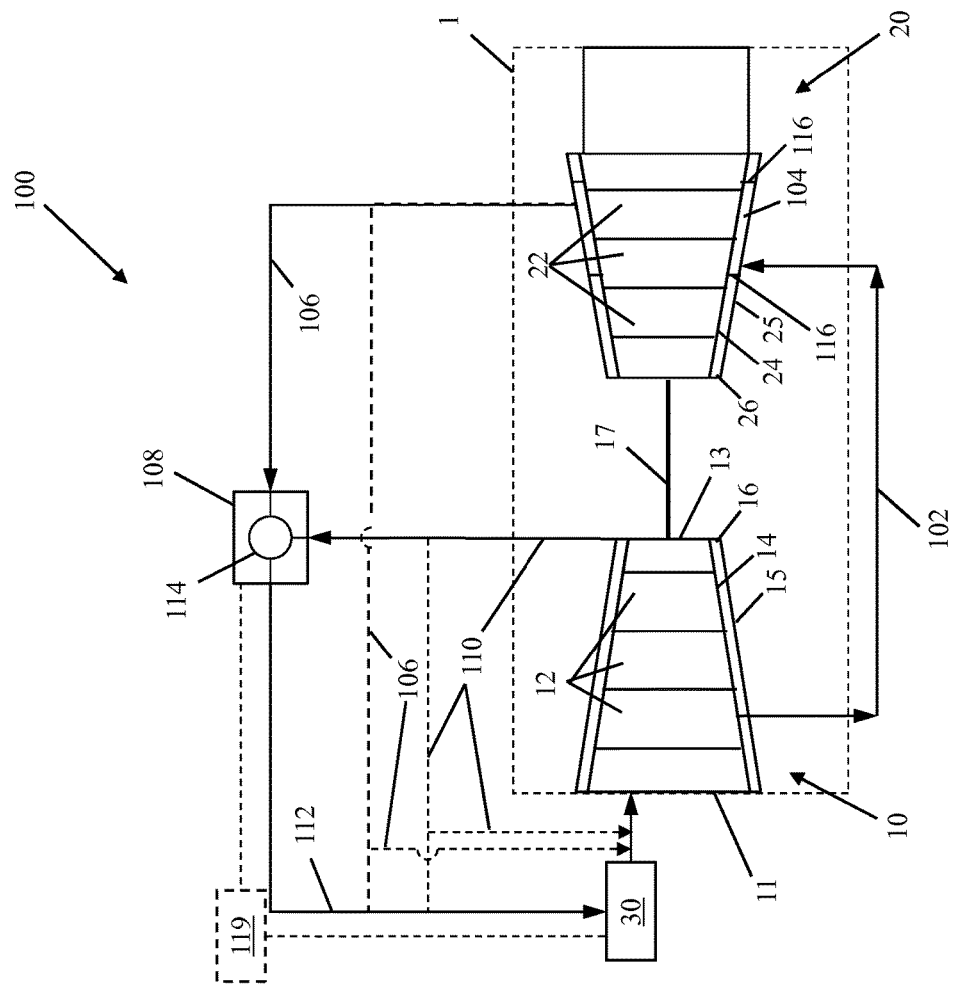
FIG. 1 shows a schematic diagram of an example of a turbomachine including an inlet bleed heating assembly according to embodiments of the invention disclosed herein.

With reference to FIG. 1, a turbomachine 1, such as a gas turbine, can include a compressor 10 and a turbine 20. Compressor 10 can include one or more inlets 11 leading to at least one compressor stage 12 and a compressor discharge 13. Compressor 10 can include an inner casing 14 and an outer casing 15 separated by a gap or cavity 16 which, in embodiments, can be substantially annular and/or substantially frustroconical. Fluid passing through discharge 13 is fed to combustors (not shown) that drive turbine 20, which drives compressor 10 via a shaft 17 or the like. Turbine 20 can include at least one turbine stage 22 surrounded by an inner casing 24 and an outer casing 25. As with compressor 10, a gap or cavity 26 can be formed between inner and outer casings 24, 25. To improve efficiency, an inlet bleed heater 30 can be included to introduce heated fluid into compressor inlet 11.

Embodiments of the invention disclosed herein can include an inlet bled heating assembly 100 including a first conduit 102 that can draw fluid from compressor 10, such as from one or more stage(s) 12, and send the fluid to a heat exchanging cavity 104 in gap or cavity 26 of turbine 20. Heat exchanging cavity 104 can extend over one stage 22 or over a plurality of stages 22 as may be suitable and/or desired. A second conduit 106 can transfer fluid from heat exchanging cavity 104 to inlet bleed heater 30 and/or inlet 11, though in embodiments second conduit 106 can transfer fluid to a mixer 108. A third fluid conduit 110 can transfer fluid from another source, such as compressor discharge 13, to mixer 108 so that fluid from second and third conduits 106, 110 can be mixed and sent through a fourth conduit 112 to inlet 11 and/or inlet bleed heater 30, though in other embodiments, third conduit 110 can deliver fluid to inlet 11 and/or inlet bleed heater 30 directly. Thus, where third conduit 110 delivers fluid to mixer 108, the mixed flow in fourth conduit 112 can be a contributor to inlet bleed heating in embodiments, and in other embodiments, fourth conduit 112 can deliver the mixed flow directly to inlet 11, which can allow elimination of inlet bleed heater 30. Mixer 108 in embodiments can include at least one valve or the like 114 with which flow from second and third conduits 106, 110 can be adjusted to achieve a desired temperature and/or flow rate of the mixed flow in fourth conduit 112. In embodiments, valve(s) 114 can be operated or actuated by a controller 119, such as a control system of turbomachine 1, an inlet bleed heater controller, and/or a controller specific to inlet bleed heating assembly 100, though in other embodiments, valve 114 can be operated or actuated manually.

Figure 2:
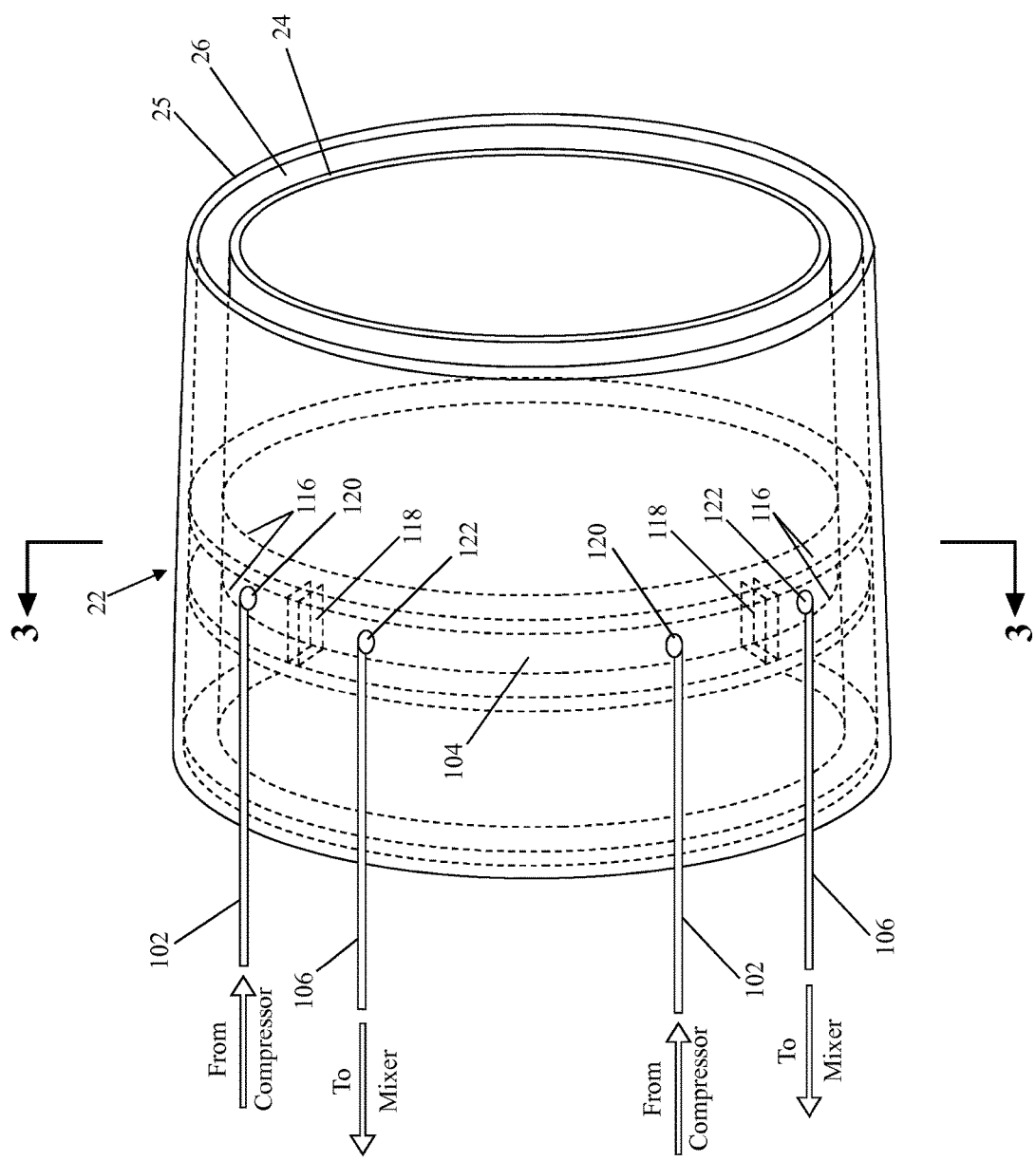
FIG. 2 shows a schematic elevation diagram of an example of a turbine with which an inlet bleed heating assembly according to embodiments of the invention disclosed herein can be used.

Heat exchanging cavity 104 can be bounded by opposed end walls 116 that can extend between inner and outer casings 24, 25 substantially perpendicular to a longitudinal axis of turbine 20. In addition, end walls 116 can extend circumferentially about inner casing 24. As can be seen in FIG. 2, cavity 104 can additionally be bounded by one or more dividing walls 118 extending between inner and outer casings 24, 25 substantially parallel to the longitudinal axis of turbine 20. A plurality of heat exchanging cavities 104 can thus be formed by using multiple dividing walls 118 and/or multiple pairs of opposed end walls 116, each cavity 104 being in fluid communication with a respective first conduit 102 and second conduit 106. Thus, fluid can enter a cavity 104 from a respective second conduit 102 via an inlet port or the like 120, flow through cavity 104, and exit to a respective third conduit 106 via an exit port or the like 122. As should be clear, cavity 104 can include and/or be in fluid communication with cooling passages of turbine blades of a stage or stages 22 at which cavity 104 is located for enhanced cooling of turbine 20 and heating of fluid travelling through cavity 104.

Figure 3:
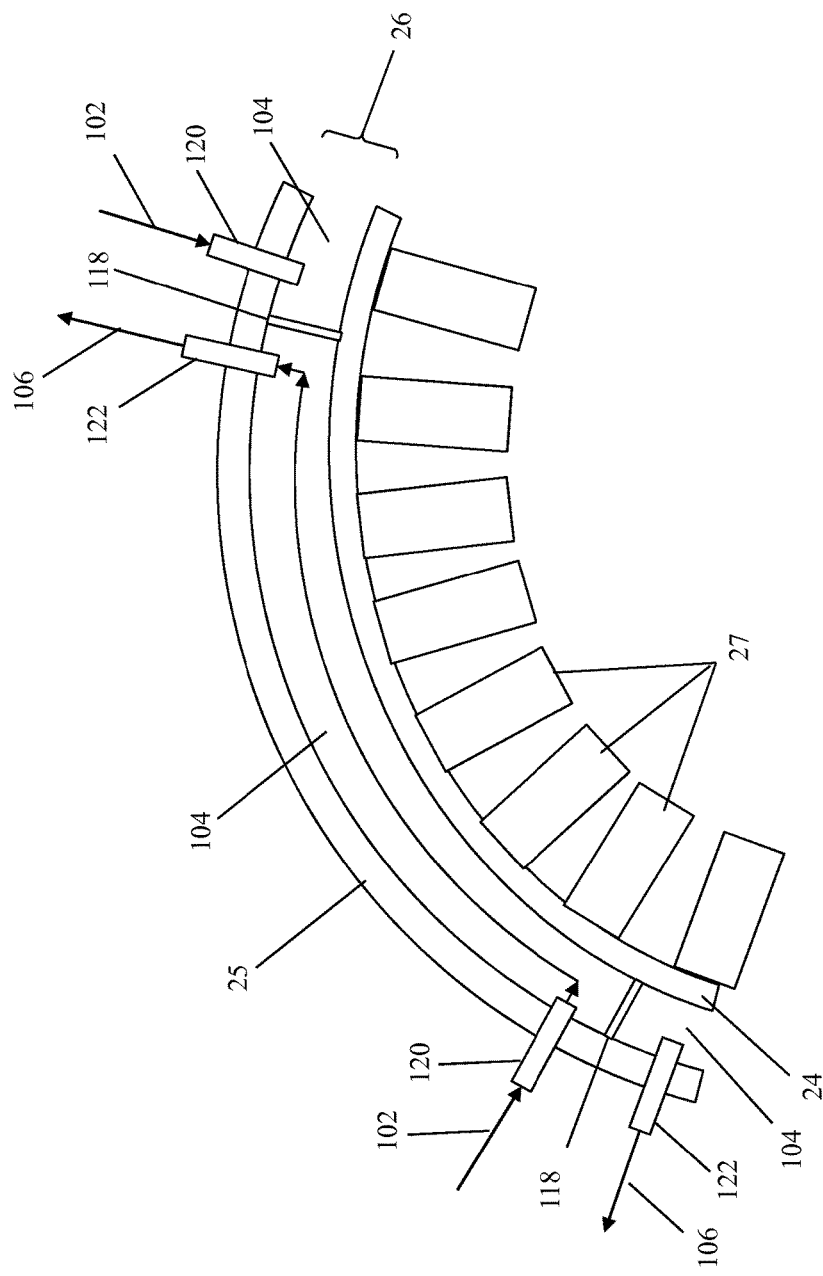
FIG. 3 shows a partial schematic cross sectional diagram of the turbine of FIG. 2 taken along line 3-3 showing a heat exchanging cavity according to embodiments of the invention disclosed herein.
Figure 4:
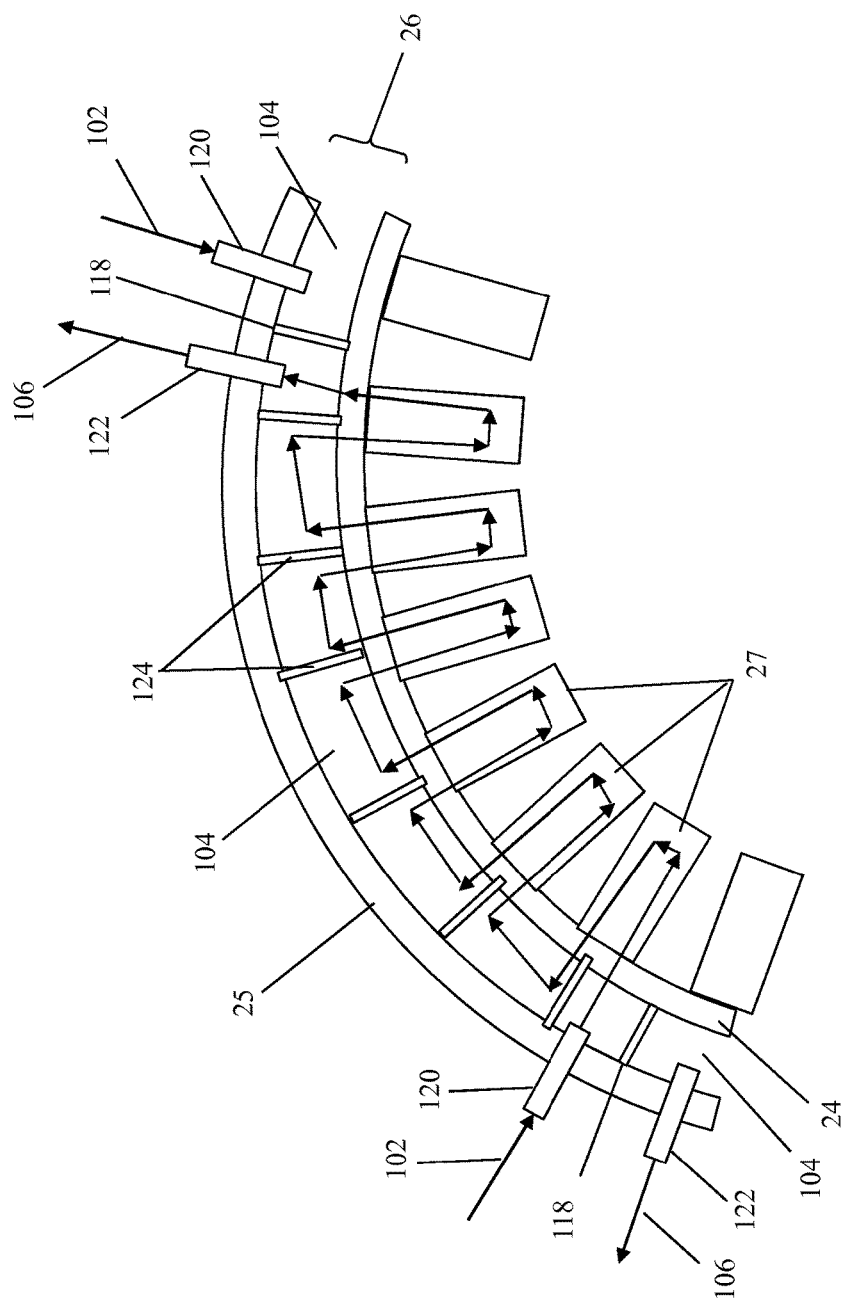
FIG. 4 shows a partial schematic cross sectional diagram of the turbine of FIGS. 2 and 3 with examples of flow path altering elements added according to embodiments of the invention disclosed herein.
Figure 5:
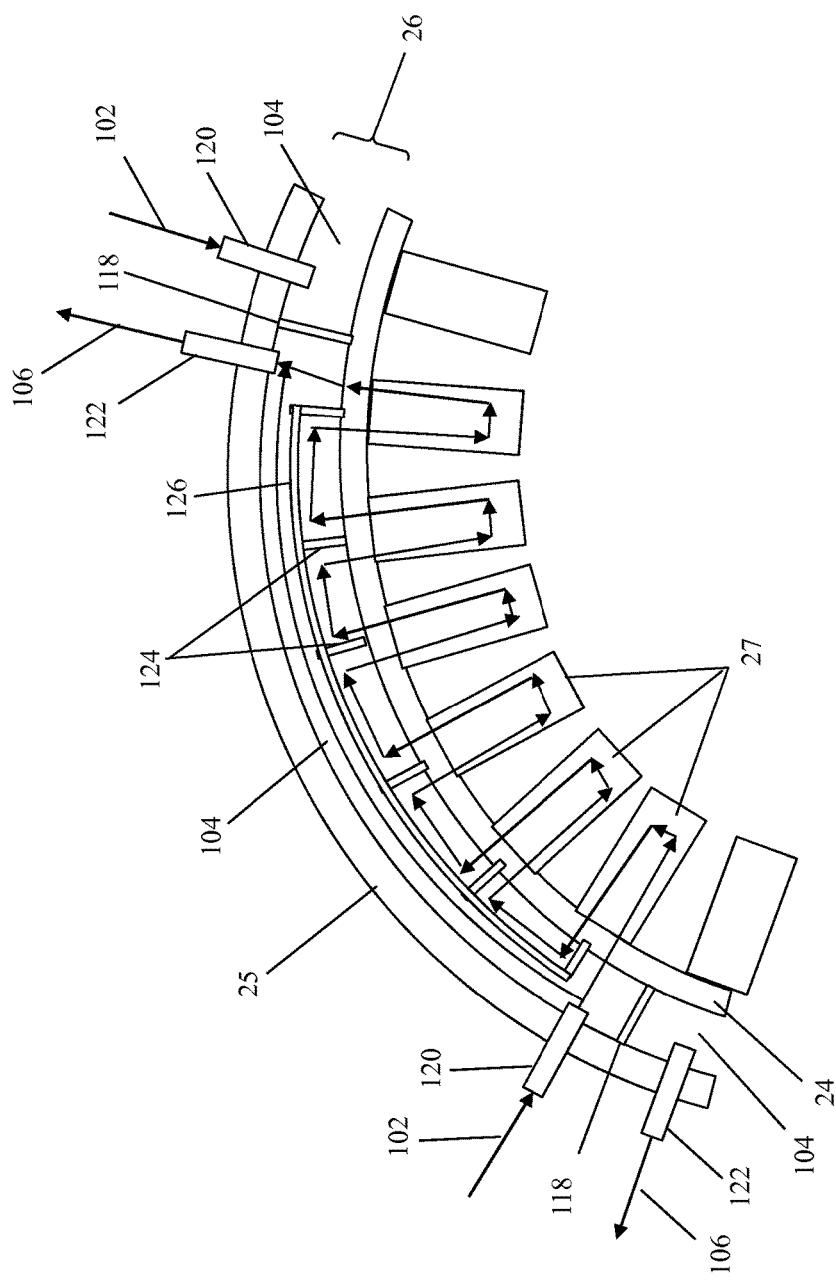
FIG. 5 shows a partial schematic cross sectional diagram of the turbine of FIGS. 2 and 3 with examples of flow path altering elements added according to embodiments of the invention disclosed herein.

With particular reference to FIG. 3, a flow path through a heat exchanging cavity 104 is illustrated. In this example, multiple such heat exchanging cavities 104 are shown and bounded by dividing walls 118. First conduit 102 can be in fluid communication with cavity 104 via inlet port 120 so that fluid can enter and flow through cavity 104 to exit port 122 and second conduit 106. Turbine blades 27 may include a cooling arrangement, such as including a hollow portion and/or cooling passages, that can be in fluid communication with cavity 104, if desired. Flow in this example is primarily through cavity 104 even when turbine blades 27 are in fluid communication with cavity 104. Where greater flow into turbine blades 27 is desired, radial baffles 124 can be added at points in cavity 104, as seen in FIG. 4. Radial baffles 124 can extend longitudinally and between inner and outer casings 24, 25 so that flow from first conduit 102 can be directed into a first turbine blade 27, back to cavity 104, into a next turbine blade 27, back to cavity 104, and so forth until the fluid exits to second conduit 106. Alternatively, as seen in FIG. 5, a circumferential baffle 126 can be added substantially parallel to inner and outer casings 24, 25, with radial baffles 124 extending between inner casing 24 and circumferential baffle 126. Thus configured, a portion of flow entering cavity 104 can be directed into turbine blades 27, while another portion can pass between baffle 126 and outer casing 25. While examples are seen in FIGS. 3-5, any combination of radial and circumferential baffles 124, 126 can be employed as may be suitable and/or desired to achieve a flow rate and/or degree of heating of fluid flowing through conduits 102, 106 and/or to cool turbine 20 and/or turbine blades 27.

Figure 6:
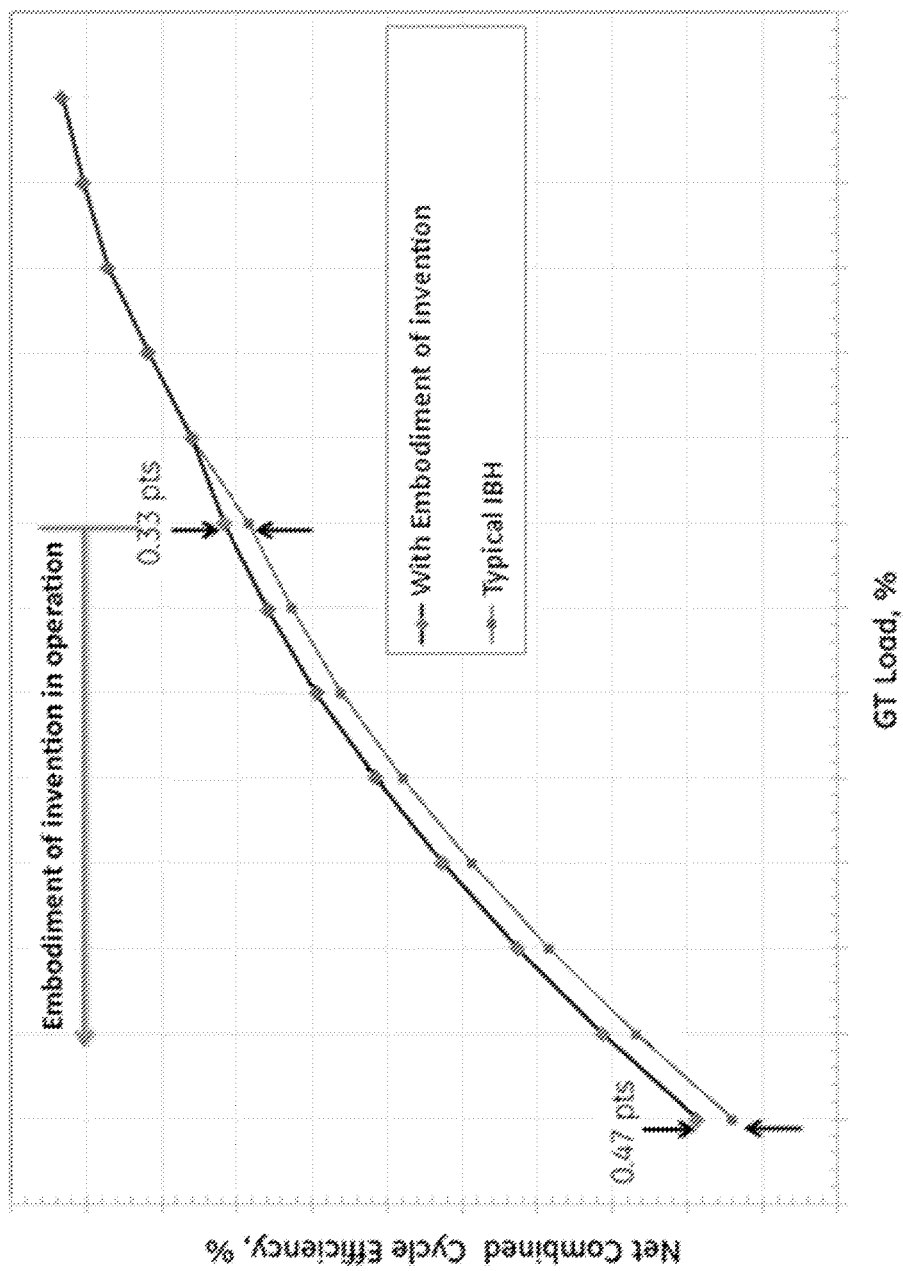
FIG. 6 shows a schematic graph comparing efficiency vs. load for a gas turbine employing embodiments of the invention and for a typical system.

By heating fluid in cavity 104 and introducing the heated fluid into inlet 11, whether alone or in conjunction with additional heated fluid from inlet bleed heater 30, performance at off-peak turbomachine operation levels can be improved. Further, by mixing and varying flow rates of fluid from cavity 104 and compressor discharge 13 with mixer 108 before introducing the fluid to inlet 11, specific temperatures and/or flow rates can be achieved to further enhance turbomachine operation. For example, as seen in FIG. 6, by employing embodiments of the invention disclosed herein when a gas turbine is operated at less than maximum load, such as, for example, less than about 80% or lower of maximum load, an efficiency increase of from about 0.3% to about 0.5% can be achieved. Such improvements to turbomachine operation can thereby save fuel and/or wear on the turbomachine, and, in the case of turbomachines employing DLN combustors, desired emissions levels can still be achieved.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A turbomachine inlet bleed heating assembly comprising:
   a cavity located at a stage of a turbine of the turbomachine between an inner casing and an outer casing of the turbine, the cavity being substantially sealed against fluid communication with the stage of the turbine;
   a first conduit configured for fluid communication with a stage of a compressor of the turbomachine and with the cavity; and
   a second conduit configured for fluid communication with the cavity and with a compressor inlet of the turbomachine.

2. The turbomachine inlet bleed heating assembly of claim 1, wherein the cavity is located at a plurality of stages of the turbine.

3. The turbomachine inlet bleed heating assembly of claim 1, wherein the cavity includes at least one wall extending between the inner and outer casings.

4. The turbomachine inlet bleed heating assembly of claim 3, wherein the at least one wall includes at least one dividing wall extending substantially parallel to a longitudinal axis of the turbine.

5. The turbomachine inlet bleed heating assembly of claim 3, wherein the at least one wall includes at least two opposed, spaced apart end walls extending substantially perpendicular to a longitudinal axis of the turbine.

6. The turbomachine inlet bleed healing assembly of claim 3, further comprising at least one baffle extending substantially parallel to at least one of the inner casing or the outer casing and configured to provide fluid communication from the first conduit to at least one turbine blade cooling passage and from the at least one turbine blade cooling passage to the second conduit.

7. The turbomachine inlet bleed heating assembly of claim 1, further comprising:
a mixer interposed between the second conduit and the compressor inlet;
a third conduit configured for fluid communication with a discharge of the compressor and in fluid communication with the mixer; and
a fourth conduit in fluid communication with the mixer and configured for fluid communication with the compressor inlet of the turbomachine, fluid received by the mixer from the second and third conduits being mixed to form a mixed flow passed to the fourth conduit by the mixer.

8. The turbomachine inlet bleed heating assembly of claim 7, wherein the mixer includes at least one valve configured to vary a flow rate of each of the second and third conduits.

9. The turbomachine inlet bleed heating assembly of claim 8, further comprising a controller in communication with the at least one valve and configured to control the at least one valve responsive to at least one of a desired temperature or a desired flow rate of the mixed flow.

10. The turbomachine inlet bleed heating assembly of claim 9, wherein the inlet bleed heating assembly includes a plurality of walls forming a respective plurality of cavities between the inner and outer casings.

11. A turbomachine comprising:
a compressor inlet;
a compressor in fluid communication with the compressor inlet and including at least one stage and a compressor discharge;
a turbine in fluid communication with the compressor discharge and including at least one stage;
a cavity located at a stage of the turbine between an inner casing and an outer casing of the turbine, the cavity being substantially sealed against fluid communication with the stage of the turbine;
a first conduit in fluid communication with a stage of the compressor and the cavity at the stage of the turbine; and
a second conduit in fluid communication with the cavity at the stage of the turbine and with the compressor inlet.

12. The turbomachine of claim 11, further comprising a mixer interposed between the second conduit and the compressor inlet, and a third conduit in fluid communication with the compressor discharge and the mixer such that fluid received from the second and third conduits is mixed to produce a mixed flow that is delivered to the compressor inlet.

13. The turbomachine of claim 12, wherein the mixer is configured to vary a respective flow from each of the second and third conduits responsive to an operating condition of the turbomachine, and to send the mixed flows through a fourth conduit to the compressor inlet.

14. The turbomachine of claim 11, further comprising a dividing wall extending between the inner and outer casings substantially parallel to a longitudinal axis of the turbine, and opposed end walls extending between the inner and outer casings substantially perpendicular to the longitudinal axis and connected to the dividing wall.

15. The turbomachine of claim 14, further comprising a plurality of dividing walls extending between the inner and outer casings and the end walls to form a respective plurality of cavities, each cavity having a respective first conduit and a respective second conduit.

16. The turbomachine of claim 14, wherein the cavity is in fluid communication with at least one turbine blade.

* * * * *